FAST-ACTING SAMPLING CIRCUIT

Filed March 7, 1955

INVENTOR.
THOMAS J. JOHNSON, JR.
BY
[signature]
ATTORNEY

United States Patent Office 2,840,707
Patented June 24, 1958

2,840,707

FAST-ACTING SAMPLING CIRCUIT

Thomas J. Johnson, Jr., Los Angeles, Calif., assignor to Gilfillan Bros. Inc., Los Angeles, Calif., a corporation of California Application March 7, 1955, Serial No. 492,507

11 Claims. (Cl. 250—27)

Figure 1:
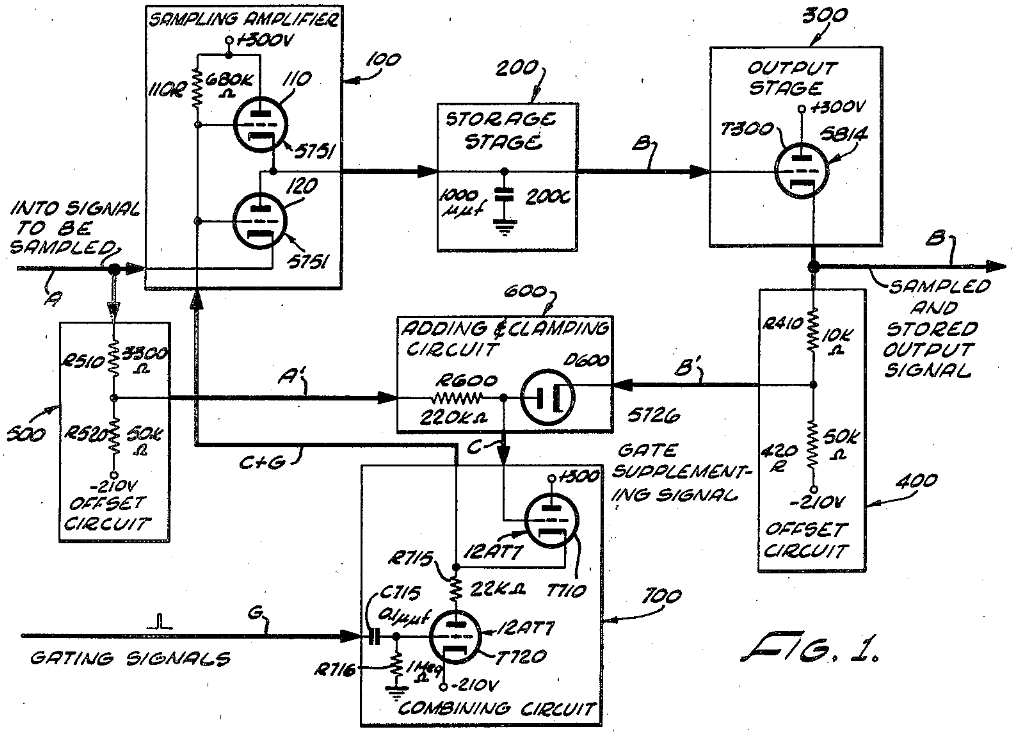

This invention relates to a fast-acting sampling circuit and, more particularly, to an unusually accurate sampling circuit having a relatively large dynamic range for input signals having both increasing and decreasing amplitudes.

In a typical conventional sampling circuit the input signal to be sampled is applied to the cathode of an amplifier stage, which may be a cascode amplifier, and a gating bias is applied to the grid electrode of the stage to prevent any signal from passing therethrough until a sample is desired. At the sampling time then a gating signal is applied which must have sufficient amplitude to allow conduction in the amplifier stage whereupon a sample may be passed through to a storage device, such as a capacitor.

Where the input signal variation may exist in a considerable range the gating operation requires a relatively large amplitude signal to insure that the amplifier stage cannot otherwise enter into a conduction state. This means that a considerable amount of gating signal power is required and further that the time for obtaining the sample desired may be extended so that it is difficult to obtain a precise sample in a short time. Moreover the amplifier stage may draw grid current to make the sample inaccurate.

The present invention obviates the above and other disadvantages of the prior art by providing a fast-acting sampling circuit where the amount of gating signal amplitude and power as well as the sampling time constant are limited. According to the present invention both the input signal amplitude and the sampled signal amplitude are continuously detected through respective voltage level shifting or offsetting circuits and are combined through a clamping device to form a gate supplementing signal which is equal to the level shifted or offset input signal or the previously stored and level shifted or offset sampled signal, whichever is less.

This gate supplementing signal then is added to the gating signal which may then be considerably smaller than that required in the prior art. The technique of the invention effectively causes the amplifier stage bias level to follow either the input signal or the sampled output signal level by a predetermined amount corresponding to its cut-off bias level. In this manner then it is insured that the amplifier stage is continuously cut off until a gating signal is applied and, at the same time, the gating signal level required is minimized.

Furthermore, by forming the gate supplement signal as the offset input signal or previously stored sampled signal as offset, whichever is less, signals having increasing and decreasing amplitudes may be sampled. The selective formation of the gate supplementing signal in this manner ensures that both sections of the cascode amplifier which may be utilized for such signals remain cut off until the gating signal is received.

The present invention may find particular application in a decoding circuit of the type described in my copending application Serial No. 488,795 filed February 17, 1955, for "Periodic Reference Signal Modulation Method and Apparatus for Representing the Position of a Device." In this circuit a modulated periodic reference signal is sampled at predetermined time intervals and a varying output signal is derived therefrom which may represent the instantaneous position of a device such as a radar antenna. The modulated signal amplitude which is sampled may be either positive or negative and may occur at a relatively high frequency so that it is essential to obtain precise samples in short time intervals to prevent unnecessary errors in decoding. Furthermore, it is desirable to limit the amount of gating power required during this decoding operation.

The invention, of course, will have many other applications as is well known in the art. For example, for one of many well known uses of sampling circuits, see Item 25 Radiation Laboratory Series, "Theory of Servomechanisms" (McGraw-Hill, 1949), in which it is shown that electronic autocorrelators require sampling circuits.

The present invention will be particularly described in the detailed description which follows with reference to its utilization in the circuit of this copending application. However, it will be understood that the circuit techniques introduced herein may find general application and therefore are not limited to this utilization.

Accordingly, it is an object of the present invention to provide a fast acting sampling circuit where the amount of gating signal amplitude required is minimized.

Another object of the invention is to provide a sampling circuit where a precise sample may be obtained in a short time with a minimum of gating signal power being required.

A further object is to provide a sampling circuit where a gate supplementing signal is formed as the offset input signal to be sampled or as the offset previously stored sampled signal, whichever is less, the gate supplementing signal being utilized to reduce the amount of gating signal amplitude required and consequently allow a sampling operation in a reduced time interval.

Another specific object of the invention is to provide a fast acting sampling circuit which may be employed in a decoding circuit for translating a modulated periodic reference signal into a varying amplitude signal which may represent the instantaneous position of a device such as a radar antenna.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 2:
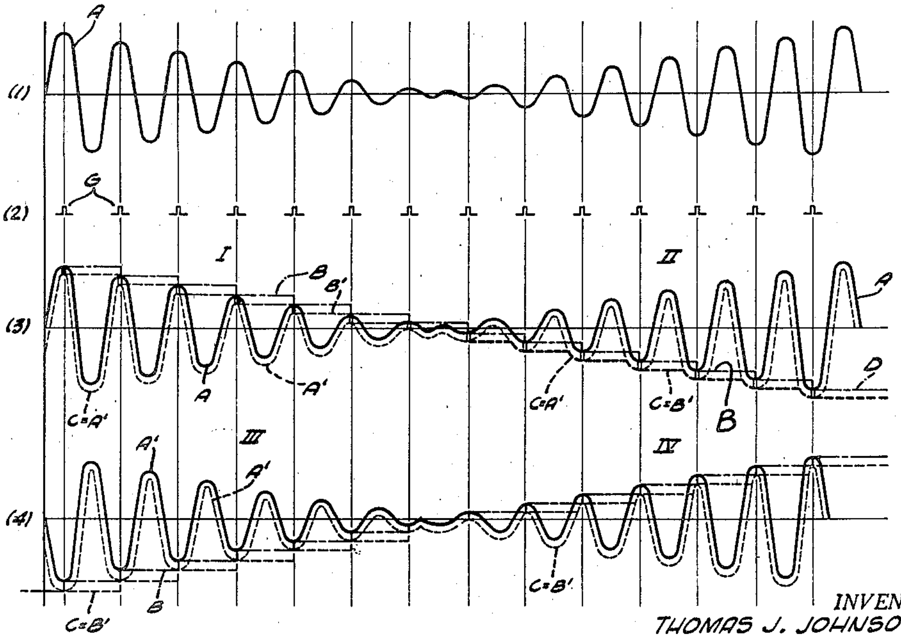

Fig. 1 is a schematic diagram of one embodiment of the invention, the principal components thereof being indicated in a block diagram arrangement; and Fig. 2 is a composite set of waveforms of various signals occurring during typical operation of the embodiment of Fig. 1.

Reference is now made to Fig. 1 wherein a fast-acting bipolar sampling circuit, according to the present invention, is shown. The circuits of the embodiment of Fig. 1 are arranged into block diagram components indicating the basic means thereof and these components will be described first without particular reference to the illustrative circuits shown therein.

Thus it will be noted in Fig. 1 that the sampling circuit includes a sampling amplifier 100 which receives an input signal A to be sampled and produces an output signal which is stored in a storage device 200 retaining a signal level corresponding thereto until the receipt of the next sampled signal.

The stored and sampled signal is applied to an output stage 300 which may be a cathode follower which produces a corresponding output signal B having substantially the stored level of the signal retained in stage 200. The output signal B is developed across an offset circuit 400 which may be considered to form part of output stage 300; circuit 400 being operative to produce a signal B′ corresponding to received signal B as offset by a predetermined amount, as will be more fully understood from the discussion which follows.

The input signal A is also divided through an offset circuit 500 producing an output signal A′ corresponding to received signal A as offset by a second predetermined amount. Signals A′ and B′ then are applied to an adding and clamping circuit 600 producing a gate supplementing signal C having an amplitude which is equal to signal A′ or B′, whichever has a lower level. It should be understood for the purpose of this specification and the claims which follow that the comparison between signals A′ and B′ is assumed to cover either positive or negative signals. This means, for example, that the invention may be practiced as well in an arrangement where circuit 600 produces an output signal C corresponding to A′ or B′, whichever is less negative, as well as an operation where the less positive signal is selected. Appropriate changes, of course, must be made in the other circuits, and specifically in sampling amplifier 100, to ensure that amplifier 100 is maintained in a nonconductive condition until a gating signal is received.

The gate supplementing signal C is then combined with gating signals G in a combining circuit 700 producing a composite output signal C+G, signal C+G being utilized to control the operation of amplifier 100.

The general operation of the invention may be better understood by referring to the typical waveforms shown in Fig. 2 where four typical input signal conditions are depicted. These conditions correspond to those which may occur in the apparatus described in my above-mentioned copending application; being referred to as conditions I, II, III and IV, corresponding reference numbers being shown in Fig. 2.

Referring now to Fig. 2, it will be noted that a typical type of input signal A to be sampled is shown as waveform (1) where a modulated envelope is to be detected at discrete time intervals corresponding to the occurrence of gating signals G shown in waveform (2). Signal A, it may be noted, changes phase by 180° after passing through a zero amplitude point. This situation corresponds to the typical antenna position representing operation of my copending application and is not to be construed as a limitation in the utilization of the present invention.

The appearance of the various waveforms, A, A′, B, B′, C and C+G, is illustrated in waveforms (3) and (4). Two typical conditions I and II are illustrated in waveform (3) and the other two, III and IV, are illustrated in waveform (4). Referring specifically to waveform (3) and condition I, it is noted that input signal A has a sinusoidal waveform which is decreasing in amplitude and has a phase position so that gating signals G occur in time coincidence with peak positive amplitude points thereof. In this situation the offset input signal A′ appears always to be lower in level than the offset sampled signal B′ so that the gate supplementing signal C is equal to A′ throughout the interval.

The signal B, it will be noted, assumes the peak level of sampled signal A between the receipt of gating signals G so that signal B′ corresponding to the offset level thereof has a similar wave shape at a reduced amplitude. The offsetting operations provided by circuits 400 and 500 are both selected so that amplifier 100 will always be cut off between the receipt of gating signals G for the amplitude range expected for input signals A.

In condition II the gating signals G occur in time coincidence with negative peaks of input signal A and input signal A has an increasing modulation envelope. In this situation the gate supplementing signal C is sometimes equal to signal B′ and other times equal to signal A′, depending upon which signal is lower in level. The net result, however, is that amplifier 100 is always cut off until gating signal G is received and further that the gating signal amplitude level required is greatly reduced.

The situations illustrated in conditions III and IV are similar to those in I and II, respectively, except that the phase of signal A is shifted 180° with respect thereto. As a result, in condition III the divided output signal B′ always appears to have the lesser amplitude relative to signal A′ and consequently gate supplementing signal C is continuously equal to signal B′. In situation IV signal C again may consist either of signal B′ or A′, whichever is less.

The functioning of the invention may be better understood by considering the typical example of a specific circuit arrangement, although the invention is not so limited. Referring again to Fig. 1 then, it will be noted that amplifier 100 may be in the form of a cascode amplifier including a first tube 110 having its anode receiving a suitable potential indicated to be 300 volts and its grid coupled to the anode through a load resistor 110R, suitable value for which is indicated to be 680K ohms. Tube 110 has its cathode connected to the anode of a second tube 120 in a cascode arrangement, the grid of tube 120 being connected to the grid of tube 110 aud the cathode thereof receives input signal A. Tubes 110 and 120 may constitute ½ sections of type 5751.

The output signal from amplifier 100 is derived at the junction between tubes 110 and 120 and applied to a storage capacitor 200C in stage 200. Capacitor 200C is connected to the grid of a tube T300 in output stage 300, the anode thereof receiving suitable potential such as 300 volts. Tube T300 may be a ½ section of type 5814. The cathode of tube T300 is connected to one end of a resistor R410 in offset circuit 400, the other end of resistor R410 being connected to a resistor R420 having its other end connected to a terminal receiving a suitable negative potential such as −210 volts. In a typical arrangement the resistors R410 and R420 may have the values 10K ohms and 50K ohms as indicated, providing the desired negative offset signal so that tubes 110 and 120 will be maintained cut off. In a similar manner, offset circuit 500 includes resistors R510 and R520 which may have the values 3300 ohms and 50K ohms so that signal A′ is offset sufficiently to maintain cut off when required. Signals A′ and B are applied to circuit 600 which is illustrated in a suitable form to include a resistor R600 and a diode D600, suitable circuit values for which are indicated to be 220K ohms and tube type 5726.

Diode D600, it will be noted, is connected with its anode attached to resistor R600 and its cathode connected to the junction of resistors R410 and R420. Thus the output signal derived from the junction of resistor R600 and diode D600 will assume substantially the level of signal A′ or B′, whichever is less. The reason for this is that if signal A′ exceds signal B, diode D600 becomes forward conducting and provides a low impedance path for signal B′, which then substantially constitutes signal C. Whereas when signal B′ exceeds signal A′, diode D600 is back biased and presents a relatively high impedance with respect to resistor R600 so that signal A′ substantially constitutes signal C.

Signal C then is applied to a tube T710 in circuit 700 having an anode receiving suitable potential such as 300 volts and a cathode coupled through resistor R715 to the anode of a tube T720, the grid of which receives gating signals G through a capacitor C715 across a load resistor R716, and the cathode of which receives a suitable negative potential such as −210 volts. The junction of a cathode of tube T710 and resistor R715 then provides a combined signal which may be represented as C+G. This signal then constitutes the bias for the grids of tubes 110 and 120. The difference between the offset signal A′ and signal A and the difference between the offset signal B′ and signal B are selected so that both tubes 110 and 120 are always biased beyond cut-off until a gating signal G is received. It is necessary that gate supplementing signal C correspond to the lower in level of signals A′ and B′ since otherwise it would be possible for one or the other of tubes 110 or 120 to be in a conducting state. For example, if the amplitude of a signal across storage capacitor 200C were less than fractional input signal A′ at any time, then tube 110 would become conducting and capacitor 200C would be charged to an erroneous voltage through this tube. Suitable circuit values for circuit 200 are indicated therein.

It is thus evident that offset circuits 400 and 500 simply provide cut-off bias for amplifier 100. Neither of these biases are impressed on amplifier 100 simultaneously because circuit 600 is a logical "or" circuit for producing gating complementing signal equal to the input signal plus the negative bias added to it in offset circuit 500 or to the stored output signal B plus the constant negative bias added to it in offset circuit 400, whichever is less. Thus offset circuits 400 and 500 voltage level shift or simply add a constant negative voltage to signals A and B, respectively.

Alternatively, a constant negative cut-off bias may be added to the gating signal G in amplifier 100 itself after signal G has been added to A or B, whichever is less. Still further, cut-off bias for amplifier 100 may be provided at the junction of resistor R715 and the cathode of tube T710 on the grid of tube T710.

It is also to be noted that the gating signal G should be of a sufficient amplitude to overcome the cut-off bias supplied by either of circuits 400 or 500, and, in addition, to overcome the maximum expected positive swing of input signal A in one complete sampling interval, i. e., the time between gates G. The latter is true because if A increases, the bias on amplifier 100 will be B′ below A. If A decreases, the bias will never be more than A′ minus A because the bias will always be A′.

The maximum expected deviation as described above is defined as the difference between the input signal level at the instant in time one of the gates G occurs and its amplitude at the instant in time the next succeeding gate G occurs. It is to be noted that the maximum expected deviation instantaneously and not periodically, as defined in the preceding sentence, during the gating interval or sampling interval has no effect on the operation of the sampling circuit of the invention because adding and clamping circuit 600 appropriately biases sampling amplifier 100 during any large positive or negative swings.

I claim:

1. In a sampling circuit including sampling means requiring a cut-off bias proportional to and having a predetermined polarity with respect to an input signal to said sampling means for preventing the production of a sample signal of said input signal at the output of said sampling means, the combination comprising: first means for producing a gating signal of a polarity opposite said predetermined polarity and at least as large in amplitude as both said cut-off bias and the maximum expected change of said input signal in a single sampling interval in the direction opposite said predetermined polarity; second means for producing a signal proportional to said cut-off bias; third means for storing the output sample signal of said sampling means; and fourth means for impressing the sum of said gating and cut-off bias signals with one of said input and stored signals on said sampling means, said input signal being added to said gating and cut-off bias signals when said stored signal changes in amplitude in the direction of said predetermined polarity and said stored signal being added to said gating and cut-off bias signals when said stored signal changes in amplitude in the direction opposite said predetermined polarity.

2. In a circuit including a sampling amplifier having a control electrode requiring a cut-off bias of a predetermined potential negative with respect to an input signal to said amplifier for preventing the production of a sample signal of said input signal at the output of said amplifier, the combination comprising: first means for producing a positive gating signal at least as large in amplitude as the sum of both said cut-off bias and the maximum expected increase in said input signal in a single sampling interval in the positive direction; second means for producing a constant negative signal at least as large as said cut-off bias; third means for storing the output sample signal of said amplifier; and fourth means for impressing the sum of said gating and negative signals with one of said input and stored signals on said control electrode of said amplifier, said input signal being added to said gating and negative signals when said input signal is less than said stored signal, and said stored signal being added to said gating and negative signals when said input signal is greater than said stored signal.

3. The invention as defined in claim 8 wherein said second means includes two negatively biased adders responsive respectively to the input signal to said amplifier and to the stored signal at the output of said third means to add said constant negative voltage to each of said input and stored signals to produce two bias level shifting signals, respectively; and wherein said fourth means includes fifth means for producing a gate supplementing signal corresponding to one of said bias level shifting signals whichever is less and sixth means for adding said gate supplementing signal to a gating signal to cause said amplifier to sample said input signal periodically.

4. The invention as defined in claim 3 wherein a cathode follower is connected from the output of said third means, one of said negatively biased adders providing the cathode circuit of said cathode followers.

5. The invention as defined in claim 4 wherein a cathode follower is connected from the output of said third means, one of said negatively biased adders providing the cathode circuit of said cathode follower; said adding and clamping circuit including a resistor and a rectifier connected serially, respectively, from said input and output adders, said diode being poled to be conductive from said input to said output adders.

6. A sampling circuit comprising: a sampling amplifier having a control electrode requiring a cut-off bias of a predetermined potential negative with respect to an input signal to said amplifier for preventing the production of a sample signal of said input signal at the output of said amplifier; first means for producing a positive gating signal at least as large in amplitude as the sum of both said cut-off bias and the maximum expected increase in said input signal in a single sampling interval in the positive direction; second means for producing a constant negative signal at least as large as said cut-off bias; third means for storing the output sample signal of said amplifier; and fourth means for impressing the sum of said gating and negative signals with one of said input and stored signals on said control electrode of said amplifier, said stored signal being added to said gating and negative signals when said input signal is greater than said stored signal; said fourth means including an adding and clamping circuit for adding said negative signal to one of said input and stored signals, whichever is less, and a combining circuit for adding the output of said adding and clamping circuit to said gating signal, said combining circuit including a first electron tube having a first cathode and a first control grid and a first anode, said first anode being connected to a positive source of potential, said first control grid being connected to the output of said adding and clamping circuit, a first resistor connected from said first cathode, the junction of said first resistor and said first cathode providing the output of said combining circuit, a second electron tube in said combining circuit having a second cathode, a second control grid, and a second anode, means for maintaining said second cathode at a negative potential, an input capacitor connected serially with the input to said combining circuit and to said second control grid, an input resistor connected from said input capacitor to a point of reference potential; said amplifier including third and fourth electron tubes having third and fourth cathodes, third and fourth control grids, and third and fourth anodes, respectively, means for maintaining said third anode at a potential positive with respect to said second cathode, said third cathode being connected to said first anode to provide the output of said amplifier, a second resistor connected from said third anode to said third control grid, said third and fourth control grids being connected together and thereby providing the input to said amplifier.

7. The invention as defined in claim 6 wherein said second means includes two negatively biased adders responsive respectively to the input signal to said amplifier and to the stored signal at the output of said third means to add said constant negative voltage to each of said input and stored signals to produce two bias level shifting signals, respectively; and wherein said fourth means includes fifth means for producing a gate supplementing signal corresponding to one of said bias level shifting signals whichever is less and sixth means for adding said gate supplementing signal to a gating signal to cause said amplifier to sample said input signal periodically; and wherein a cathode follower is connected from the output of said third means, one of said negatively biased adders providing the cathode circuit of said cathode follower.

8. In a sampling circuit including means to produce an input signal, a storage device, sampling means to pass said input signal to the storage device upon receipt of a gating signal, and gating means for producing a gating signal to operate said sampling means, a biasing circuit for said sampling means, said biasing circuit comprising: means for comparing said input signal to the stored output signal of said storage device to produce a gate supplementing signal proportional to said input signal when the difference between said input signal and said storage signal is of one algebraic sign and proportional to said storage signal when the difference between said input signal and said storage signal is of the opposite algebraic sign; and means for impressing the sum of said gate supplementing signal and said gating signal on said sampling means to operate it.

9. A sampling circuit actuable to derive amplitude samples of an applied input signal in response to an applied gating signal, said circuit comprising: an amplifier having a first input circuit for receiving the input signal to be sampled and a second input circuit for receiving a control signal; storage means for receiving samples of said input signal passed through said amplifier; means for producing a supplementing signal as a function of the applied input signal and the previously stored sample in said storage means; and a combining circuit for receiving said supplementing signal and said gating signal to produce said control signal for providing a cut-off bias for said amplifier prior to receipt of said gating signal and for actuating said amplifier to derive said sample upon receipt of said gating signal.

10. In a sampling circuit including an amplifier having a first input circuit for receiving an input signal A to be sampled at a predetermined time upon application of a gating signal G, and a second input circuit for receiving a control signal, said second input circuit being normally biased to prevent conduction in said amplifier until receipt of said gating signal G and being then operative to produce a sampled output signal B; a device for rendering said sampling circuit fast acting comprising: first means for combining said signal A with a predetermined potential to form a modified signal A′ differing in amplitude from signal A by an amount corresponding to the cut-off bias of said amplifier; second means for combining said signal B with a predetermined potential to form a modified signal B′ differing in amplitude from signal B by an amount corresponding to the cut-off bias of said amplifier; third means for producing a gate supplementing signal C corresponding to signal A′ or B′ whichever is less; and fourth means for combining signal C with signal G to produce said control signal.

11. In a circuit including sampling means receiving a cut-off bias proportional to and having a predetermined polarity with respect to an input signal applied to said sampling means for preventing the operation thereon until receipt of a gating signal, the combination comprising: first means for producing a gating signal of a polarity opposite to said predetermined polarity; second means for producing a second signal proportional to said cut-off bias; third means for storing the output sample signal of said sampling means; and fourth means for receiving said gating and cut-off bias signals and said input and storage signals and impressing a control signal upon said sampling means, said control signal combining said gating signals with said second signal and said input signal during periods of decreasing amplitude in said output sample signal and combining said gating signals with said second signal and said output sample signal during periods of increasing amplitude in said output sample signal.

References Cited in the file of this patent

UNITED STATES PATENTS

| | | |
|---|---|---|
| 2,510,054 | Alexander | June 6, 1950 |
| 2,542,152 | McConnell | Feb. 20, 1951 |
| 2,629,857 | Deloraine | Feb. 24, 1953 |
| 2,662,118 | Schouten | Dec. 8, 1953 |